INVENTOR.
ERWIN v. WASIELEWSKI
KARL-HEINZ HANDWERK

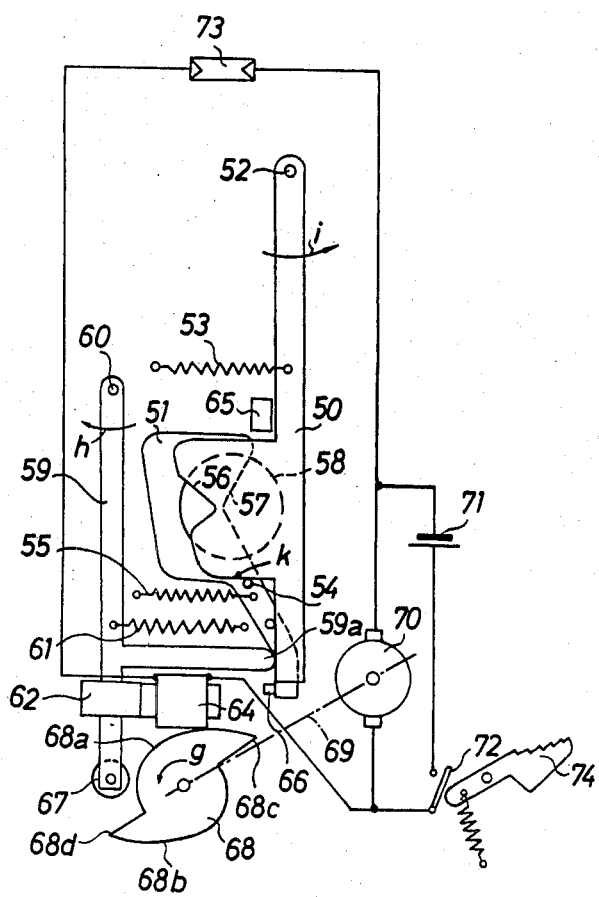

United States Patent Office 3,471,226
Patented Oct. 7, 1969

3,471,226
MOTION PICTURE CAMERA WITH COMBINED SHUTTER AND DIAPHRAGM MEANS
Erwin von Wasielewski and Karl-Heinz Handwerk, Munich, Germany, assignors to Agfa-Gevaert Aktiengesellschaft, Leverkusen, Germany
Filed Sept. 6, 1967, Ser. No. 665,808
Claims priority, application Germany, Sept. 13, 1966, A 53,490
Int. Cl. G03b 7/14
U.S. Cl. 352—141                          20 Claims

ABSTRACT OF THE DISCLOSURE

A motion picture camera which comprises a combined shutter and diaphragm including at least one blade movable from a first position in which the exposure aperture is covered to a range of second positions in each of which the blade uncovers a differently dimensioned portion of the aperture. The blade can be propelled from first position in response to impetus transmitted by an impeller which is cocked by the drive for the film transporting mechanism and is biased to uncocked position to thereby strike against the blade. An electromagnet is energized in response to starting of the drive and produces an electromagnetic field whose strength is a funtcion of the intensity of scene light. The electromagnetic field directly opposes movement of the shutter blade from first position or controls the speed of the impeller during travel to uncocked position.

CROSS-REFERENCE TO RELATED APPLICATION

This invention deals with improvements in cameras of the type disclosed in the copending application Ser. No. 531,835, filed Mar. 4, 1966, by Erwin von Wasielewski and assigned to the same assignee and now Patent No. 3,412,660.

BACKGROUND OF THE INVENTION

The present invention relates to photographic cameras, and more particularly to improvements in motion picture cameras of the type wherein the shutter can be set to furnish different exposure times and a range of aperture sizes. Still more particularly, the invention relates to improvements in motion picture cameras of the type wherein the exposure time and the aperture size vary as a function of the intensity of scene light.

SUMMARY OF THE INVENTION

It is an object of our invention to provide a motion picture camera with a simple, rugged, compact and inexpensive shutter which can also act as a diaphragm.

Another object of our invention is to provide a motion picture camera wherein operation of the shutter is automatically synchronized with operation of the film transporting mechanism.

A further object of the invention is to provide a motion picture camera wherein the shutter may comprise one or more blades and wherein each change in shutter speed automatically brings about an appropriate change in the size of the aperture.

An additional object of the invention is to provide a novel motion transmitting connection between the drive for the film transporting mechanism and the shutter of a motion picture camera.

A concomitant object of the invention is to provide a novel electric circuit for use in a motion picture camera of the above outlined character.

A further object of the invention is to provide a motion picture camera which comprises a small number of simple and rugged moving parts and which, therefore, is less prone to malfunction than many presently known motion picture cameras.

Our invention is embodied in a motion picture camera which comprises shutter means having at least one blade movable between a first or idle position and a plurality of second positions, means for biasing the blade to first position in which the blade covers an aperture serving to admit scene light to an unexposed film frame, film transporting means comprising a pulldown or a like member operative to advance the film lengthwise so as to place successive unexposed frames into registry with the optical system of the camera, drive means for moving the pulldown at a predetermined frequency, impeller means receiving motion from the drive means at the same predetermined frequency to impart to the blade impetus for movement from first position, and electromagnet means arranged to produce an electromagnetic field of variable strength to determine that second position of the blade which the latter assumes in response to an impetus from the impeller means. The electromagnetic field can oppose movement of the blade from first position, or such field can oppose movement of the impeller means from cocked to uncocked position to thus reduce the strength of the impetus which is transmitted to the blade. If the blade moves to a second position which is remote from the first position, the aperture is exposed for a longer period of time and the blade exposes a large portion of the aperture. However, if the blade is propelled to a second position which is nearer to first position, the exposure time is shorter and the effective size of the aperture is smaller. The electromagnet is preferably connected in series with a light-sensitive resistor whose resistance varies as a function of the intensity of scene light.

The novel features which are considered as characteristic of the invention are set forth in particular in the appended claims. The improved motion picture camera itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is a schematic fragmentary vertical sectional view of a third motion picture camera.

DESCRIPTION OF THE PREFERRED EMBODIMENTS

Figure 1:
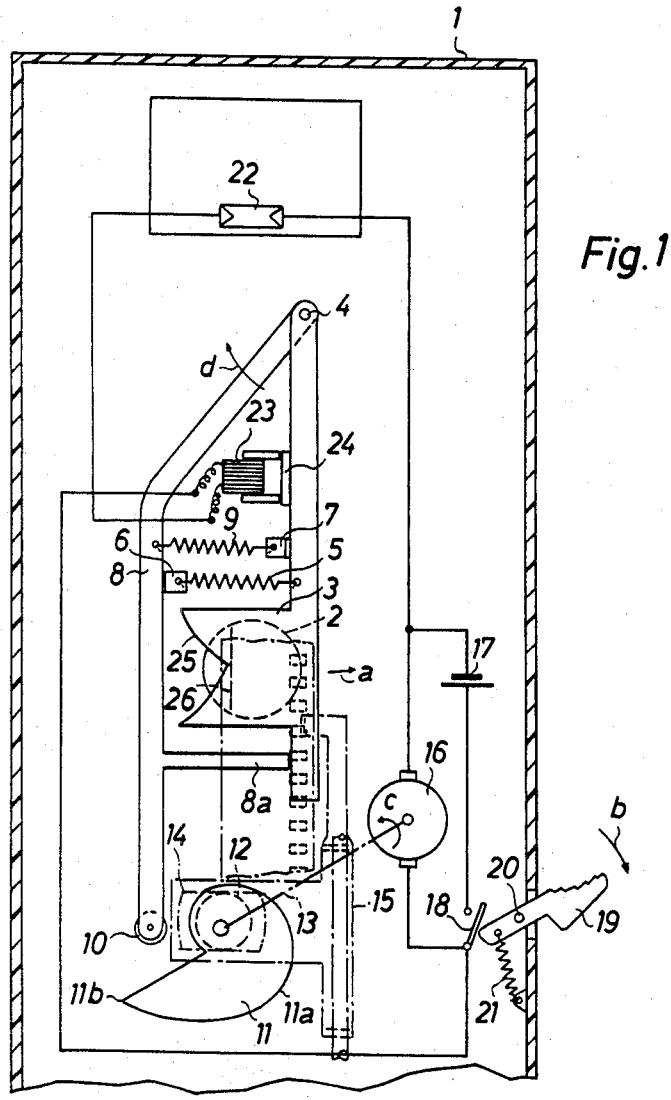
FIG. 1 is a schematic fragmentary vertical sectional view of a motion picture camera which embodies one form of our invention.

Referring first to FIG. 1, there is shown a portion of a of which provides an exposure aperture 2. The shutter motion picture camera comprising a housing 1 a portion includes a single movable blade 3 which is located directly in front of the aperture 2 and is turnable on a pivot pin 4 carried by the housing 1. A return spring 5 biases the blade 3 to a first or idle position in which the blade cooperates with an opaque fixed blade or mask 26 of the shutter to close the aperture 2, i.e., to prevent the scene light from reaching an unexposed film frame. One end of the spring 5 is anchored in a stop 6 which is fixed to the housing 1. When the spring 5 is free to contract, it maintains the blade 3 in abutment with a fixed stop 7.

The means for moving the blade 3 from its first or idle position to one of several second positions in each which the blade exposes a differently dimensioned portion of the aperture 2 comprises an impeller 8 which is turnable on the pivot pin 4 (but can also turn about a separate pivot pin) and is biased by a helical spring 9 which tends to maintain it in an uncocked position, i.e., in abutment with the aforementioned stop 6. The spring 9 operates between the impeller 8 and the stop 7. The lower end portion of the impeller 8 carries a roller follower 10 which can track a specially configured cam face 11a on a motion transmitting disk cam 11 which forms part of a drive for the shutter and for a film transporting mechanism. The cam 11 is attached to the output shaft 13 of an electric motor 16 which also forms part of the aforementioned drive and is accommodated in the housing 1. The output shaft 13 further carries an eccentric 12 which is received in a slot 14 provided in a pulldown lever 15 of the film transporting mechanism. The motor 16 can drive the output shaft 13 directly or through the intermediary of a variable speed transmission which is not shown in the drawing. The transmission is used if the film is to be transported at two or more speeds, namely, if the pulldown lever is to be operated at two or more frequencies. The electric circuit of the motor 16 includes a battery 17 or another suitable source of electrical energy and a normally open master switch 18 which is connected in series with the motor 16 and battery 17. A trigger 19 is rockably supported by the housing 1 and can be manipulated by hand to close the master switch 18 for a desired interval of time whereby the motor 16 rotates and drives the output shaft 13, eccentric 12 and cam 11 at a predetermined speed. The trigger 19 resembles a two-armed lever and is turnable on a pivot pin 20. A spring 21 biases the trigger 19 to an inoperative position in which the trigger permits the master switch 18 to open.

A branch circuit which is parallel with the motor circuit contains in series a light-sensitive resistor 22 and an electromagnet 23. This branch can also contain suitable voltage stabilizing means (not shown). The electromagnet 23 is energized in response to closing of the master switch 18 and produces an electromagnetic field whose strength depends on the resistance of the light-sensitive resistor 22, i.e., on the intensity of scene light. The light-sensitive surface of the resistor 22 is exposed to scene light. The electromagnet 23 can attract a plate-like portion 24 on the shutter blade 3. The portion 24 consists of magnetizable material and is attracted with a force which depends on the strength of the electromagnetic field, i.e., which is a function of the intensity of scene light. When the arm 8a of the impeller 8 transmits an impetus to the shutter blade 3, the latter moves the magnetizable portion 24 away from the electromagnet 23 against the opposition of the electromagnetic field and return spring 5. In other words, the electromagnetic field acts directly on the shutter blade 3 and cooperates with the spring 5 to urge the blade to its first or idle position in which the aperture 2 is covered.

The blade 3 is provided with a substantially V-shaped cutout or recess 25 bounded by two arcuate edge faces. This cutout 25 travels across the aperture 2 when the blade 3 receives an impetus and turns in the direction indicated by arrow a. The size of the uncovered portion of the aperture 2 will depend on the position of the cutout 25 with reference to the aforementioned mask 26.

The operation is as follows:

In order to make one or more exposures, the user turns the trigger 19 in the direction indicated by arrow b to close the master switch 18. A current flows through the motor 16 which drives the output shaft 13, eccentric 12 and cam 11. Current also flows through the light-sensitive resistor 22 and electromagnet 23. The strength of the electromagnetic field produced by the electromagnet 23 is a function of the intensity of scene light.

The output shaft 13 rotates in the direction indicated by arrow c and the eccentric 12 drives the pulldown lever 15 whereby the latter transports the film in stepwise fashion at a predetermined frequency, always by the length of a frame. The cam 11 rotates with the output shaft 13 and its face 11a engages the follower 10 to move the impeller 8 to cocked position (arrow d). When the tip 11b of the cam face 11a moves beyond the follower 10, the impeller 8 is fully cocked and the spring 9 is free to contract to propel the arm 8a against the blade 3. The arrangement is such that the arm 8a strikes against the blade 3 shortly before the impeller 8 returns to uncocked position and abuts against the stop 6. The blade 3 turns on the pivot pin 4 (arrow a) whereby a portion of the impetus transmitted thereto by the arm 8a is used up to move the magnetizable portion 24 away from the electromagnet 23. The resistance offered by the electromagnetic field to such movement of the portion 24 depends on the strength of the current flowing through the electromagnet 23, i.e., on the resistance of the resistor 22 and hence on the intensity of scene light. In other words, the extent to which the blade 3 moves from its first position (abutment with stop 7) depends on the strength of the electromagnetic field which means that the exposure time and the effective size of the aperture 2 will depend on the strength of the current flowing through the electromagnet 23. If the intensity of scene light is very high, the resistance of the resistor 22 is low and the electromagnet 23 produces a strong electromagnetic field which offers considerable opposition to movement of magnetizable portion 24 in the direction indicated by arrow a. The major portion of the impetus transmitted to the blade 3 by the arm 8a of the impeller 8 is then consumed to overcome the resistance of the electromagnetic field and the remaining portion of the impetus is used to overcome the bias of the return spring 5. This spring begins to contract before the blade 3 fully uncovers the aperture 2 so that the shutter will provide a short exposure time and a relatively small effective aperture. Since the impeller 8 receives motion from the output shaft 13 which also drives the pulldown lever 15, the operation of the shutter is accurately synchronized with that of the film transporting mechanism.

The camera will make exposures as long as the user continues to maintain the master switch 18 in closed position.

Figure 2:
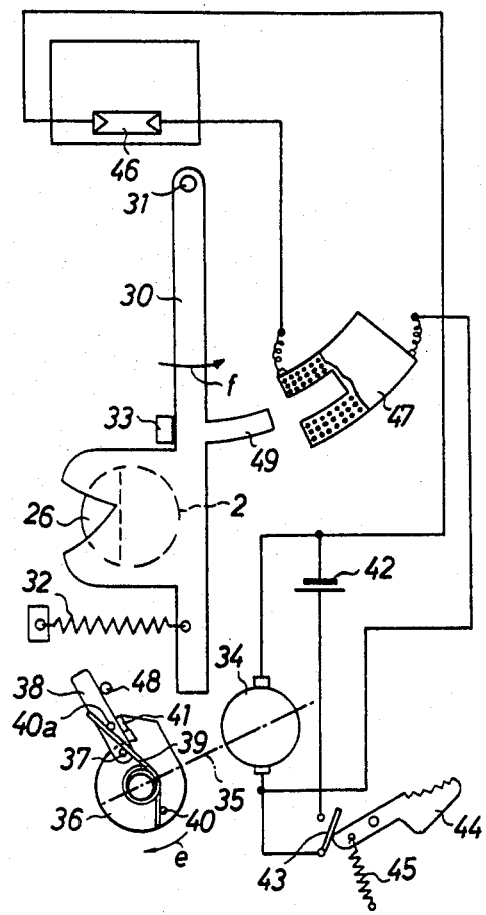
FIG. 2 is a similar schematic fragmentary vertical sectional view of a second motion picture camera.

FIG. 2 illustrates a portion of a motion picture camera wherein the shutter comprises a single movable blade 30 which is pivotable on a fixed pin 31 and carries a permanent magnet 49. A return spring 32 urges the blade 30 to a first or idle position in which the blade abuts against a fixed stop 33 and covers the aperture 2. The fixed blade or mask 26 is mounted in the same way as in the motion picture camera of FIG. 1.

The drive includes an electric motor 34 having an output shaft 35 which supports a motion transmitting carrier 36. The shaft 35 also drives the pulldown lever (not shown) in the same way as described in connection with FIG. 1. The carrier 36 has an eccentric pin 37 for an impeller 38 which is biased by a torsion spring 39 so that it normally bears against a stop post 41 of the carrier 36. The spring 39 operates between a pin 40 on the carrier 36 and a pin 40a on the impeller 38. A cocking stud 48 is fixed to the housing of the motion picture camera in the path of orbital movement of the impeller 38 and serves to pivot the impeller on the pin 37 against the opposition of the spring 39.

The electric circuit of the camera includes the aforementioned motor 34, a battery 42, a normally open master switch 43, an electromagnet 47 and a light-sensitive resistor 46. The switch 43 can be closed by a manually operated trigger 44 against the opposition of a spring 45. The motor 34 is connected in series with the battery 42 and master switch 43. The branch including the electromagnet 47 and resistor 46 is connected in parallel with the motor 34.

When the user closes the switch 43 through the intermediary of the trigger 44, the coil of the electromagnet 47 is energized and the strength of the resulting electromagnetic field is a function of the intensity of scene light, i.e., such strength depends on the resistance of the resistor 46 which is exposed to scene light. The motor 34 drives the shaft 35 (arrow $e$) and the carrier 36 drives the impeller 38 which is caused to engage the cocking stud 48 and to deform the spring 39. This spring is free to dissipate energy as soon as the tip of the impeller 38 moves past the cocking stud 48 whereby the impeller rapidly returns to uncocked position (abutment with the post 41) and transmits to the shutter blade 30 an impetus (arrow $f$). The blade 30 moves its permanent magnet 49 into the coil of the energized electromagnet 47 which opposes such movement of the magnet 49 because like poles of the magnet 49 and electromagnetic field of the coil are adjacent to each other. Thus, the electromagnet 47 opposes movement of the shutter blade 30 from idle position (abutment with the stop 33) with a force which is a function of the intensity of scene light. This means that the exposure time and the effective size of the aperture 2 is a function of the intensity of scene light because the spring 32 can return the blade 30 to idle position with a delay whose duration depends on the force required to overcome the opposition of the electromagnetic field. The magnitude of the force which propels the impeller 38 against the shutter blade 30 is constant, and the bias of the spring 32 is also constant. In other words, only the strength of the electromagnetic field which is produced by the electromagnet 47 varies as a function of the intensity of scene light.

FIG. 3 shows a portion of a third motion picture camera wherein the shutter comprises two movable blades 50, 51. The blade 50 is turnable on a fixed pivot pin 52 and is biased to idle position by a return spring 53. The other blade 51 is turnable on a fixed pin 54 and is biased to idle position by a second return spring 55. The blades 50, 51 are respectively provided with substantially triangular cutouts or recesses 56, 57 which move in opposite directions when the blades are caused to leave their idle positions. When in idle positions, the blades 50, 51 cover an exposure aperture 58.

The means for moving the blades 50, 51 to a plurality of second positions comprises an impeller 59 which is turnable on a fixed pivot pin 60. A spring 61 serves to propel the impeller 59 to uncocked position shown in FIG. 3 in which a permanent magnet 62 of the impeller abuts against a fixed electromagnet 64. Stops 65, 66 are provided to arrest the blades 50, 51 in their respective idle positions.

The impeller 59 carries a roller follower 67 which can track the faces 68$a$, 68$b$ of a motion transmitting cam 68 mounted on the output shaft 69 of an electric motor 70. The latter is connected in series with a battery 71 and a normally open master switch 72 which can be closed by a trigger 74. The electromagnet 64 is connected in parallel with the motor 70 and in series with a light-sensitive resistor 73 which is exposed to scene light.

In order to make one or more exposures, the user actuates the trigger 74 to close the master switch 72 whereby the motor 70 drives the shaft 69, cam 68 and an eccentric or the like (not shown) which operates the film transporting mechanism to advance the film twice by the length of a frame in response to each revolution of the shaft 69. The cam 68 rotates in the direction indicated by arrow $g$. The strength of the electromagnetic field produced by the electromagnet 64 depends on the resistance of the resistor 73, i.e., it is a function of the intensity of scene light.

As the cam 68 rotates, its faces 68$a$, 68$b$ engage the follower 67 and cock the impeller 59 against the opposition of the spring 61 (arrow $h$). When the follower 67 moves off the tip 68$c$ or 68$d$ of the cam 68, the spring 61 contracts suddenly and the arm 59$a$ of the impeller 59 transmits to the blades 50, 51 an impetus which causes the cutouts 56, 57 to move in opposite directions (arrows $i$ and $k$) whereby the blades uncover a portion of the aperture 58 whose size is a function of the intensity of scene light. This is due to the fact that like poles of the permanent magnet 62 and electromagnetic field produced by the electromagnet 64 are adjacent to and repel each other, i.e., the electromagnetic field directly opposes movement of the impeller 59 to uncocked position whereby the strength of the impetus transmitted to the blades 50, 51 varies with changes in scene brightness. The arm 59$a$ strikes against the blades 50, 51 shortly before the impeller 59 returns to uncocked position. In this embodiment of our invention, the electromagnetic field of the electromagnet 64 determines the speed at which the arm 59$a$ travels at the time it strikes against the blades 50, 51.

It is clear that the camera is susceptible of many additional modifications without departing from the spirit of our invention. For example, the shutter of the camera shown in FIG. 1 or 2 could comprise two movable blades and the camera could comprise two electromagnets, one for each blade. Furthermore, the camera of FIG. 3 could be provided with a shutter having a single movable blade and the cam 58 could be designed to cock the impeller 59 only once during each revolution of the output shaft 69. Also, the light-sensitive resistor 22, 46 or 73 can be replaced by a variable resistor which is adjustable by hand in accordance with measurements of scene brightness.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended claims:

1. In a motion picture camera, a combination comprising shutter means movable between a first position and a plurality of second positions; means for biasing said shutter means to first position; film transporting means comprising a member operative to advance the film lengthwise so as to place successive unexposed frames into registry with the optical system of the camera; drive means for operating said member at a predetermined frequency; impeller means receiving motion from said drive means at said predetermined frequency to impart to said shutter means impetus for movement from said first position; and electromagnet means arranged to produce an electromagnetic field of variable strength to determine that second position of said shutter means which the latter assumes in response to an impetus from said impeller means.

2. A combination as defined in claim 1, further comprising means providing an exposure aperture which is covered by the shutter means in said first position thereof, said shutter means being arranged to uncover a differently dimensioned portion of said aperture in each of said second positions thereof so that said aperture can admit scene light to successive frames of the film in response to successive movements of said shutter means from first position.

3. A combination as defined in claim 1, wherein said electromagnetic field directly opposes movement of said shutter means from said first position.

4. A combination as defined in claim 3, wherein said shutter means comprises at least one blade and permanent magnet means carried by said blade, like poles of said field and said permanent magnet means being adjacent to each other and said permanent means approaching said field in response to movement of said shutter means from first position.

5. A combination as defined in claim 3, wherein said shutter means comprises at least one blade having a magnetizable portion which is attracted by said electromagnetic field but moves away from said field in response to movement of said shutter means from first position.

6. A combination as defined in claim 1, wherein said electromagnet means is arranged to reduce the strength of the impetus transmitted to said shutter means.

7. A combination as defined in claim 6, wherein said impeller means comprises a permanent magnet and wherein like poles of said permanent magnet and said electromagnetic field are adjacent to each other, said impeller means being movable from a cocked to an uncocked position to thereby transmit said impetus and said permanent magnet approaching said electromagnetic field during movement of said impeller means toward uncocked position.

8. A combination as defined in claim 1, wherein said shutter means comprises a single travelling blade movable between said positions and a fixed blade to define therewith passages for entry of light into selected portions of said aperture.

9. A combination as defined in claim 1, further comprising means for regulating the strength of said electromagnetic field as a function of the intensity of scene light.

10. A combination as defined in claim 9, wherein said regulating means comprises light-sensitive resistor means connected in series with said electromagnet means.

11. A combination as defined in claim 10, further comprising a source of electrical energy connected in series with said electromagnet means and said resistor means.

12. A combination as defined in claim 11, further comprising switch means connected in series with said source.

13. A combination as defined in claim 12, further comprising manually operated trigger means for closing said switch means.

14. A combination as defined in claim 13, wherein said drive means comprises an electric motor which is connected in circuit with said source in response to closing of said switch means.

15. A combination as defined in claim 1, wherein said impeller means is movable from a cocked position to an uncocked position to thereby transmit an impetus to said shutter means, and further comprising means for permanently biasing said impeller means to uncocked position with a predetermined force, said drive means comprising motor means having a rotary output member and motion transmitting means driven by said output member and arranged to cock and thereupon release said impeller means so that the latter can follow the bias of said last mentioned biasing means.

16. A combination as defined in claim 15, wherein said motion transmitting means comprises a cam having a cam face and said impeller means comprises follower means tracking said cam face.

17. A combination as defined in claim 16, wherein said cam face has at least one portion which permits unimpeded movement of said impeller means from cocked position.

18. A combination as defined in claim 1, wherein said drive means comprises a motor having a rotary output member, a carrier affixed to said output member and coupling means connecting said impeller means to said carrier so that said impeller means orbits about said output member.

19. A combination as defined in claim 18, wherein said coupling means comprises a pivot member provided on said carrier and turnably supporting said impeller means, means for biasing said impeller means for movement with reference to said pivot means, and stop means on said carrier for said impeller means.

20. A combination as defined in claim 19, further comprising fixed cocking means provided in the path of orbital movement of said impeller means to turn the latter on said pivot member against the opposition of said biasing means.

References Cited
UNITED STATES PATENTS

| | | | |
|---|---|---|---|
| 3,363,967 | 1/1968 | Schmitt | 352—141 XR |
| 3,412,660 | 11/1968 | Wasielewski et al. | 95—10 |

NORTON ANSHER, Primary Examiner

J. F. PETERS, Assistant Examiner

U.S. Cl. X.R.

95—10, 64; 352—207